United States Patent [19]

August, Jr. et al.

[11] Patent Number: 5,475,702
[45] Date of Patent: Dec. 12, 1995

[54] DIODE PUMPED SLAB MODULE

[75] Inventors: John L. August, Jr., Schenectady;
Mark J. Kukla, Ballston Spa; Josef R. Unternahrer, Niskayuna, all of N.Y.

[73] Assignee: General Electric Company, Schenectady, N.Y.

[21] Appl. No.: 435,238

[22] Filed: May 5, 1995

Related U.S. Application Data

[63] Continuation of Ser. No. 251,142, May 31, 1994, abandoned.

[51] Int. Cl.$^6$ ........................................... H01S 3/09
[52] U.S. Cl. .............................. 372/69; 372/65; 372/35; 372/92
[58] Field of Search .................... 372/34, 75, 65, 372/92, 69, 35

[56] References Cited

U.S. PATENT DOCUMENTS

| | | | |
|---|---|---|---|
| 4,710,940 | 12/1987 | Sipes, Jr. | 372/75 |
| 4,894,839 | 1/1990 | Baer | 372/75 |
| 5,251,369 | 10/1993 | August, Jr. et al. | 29/281.5 |
| 5,253,260 | 10/1993 | Palombo | 372/34 |
| 5,278,860 | 1/1994 | August, Jr. et al. | 372/70 |

*Primary Examiner*—Leon Scott, Jr.
*Attorney, Agent, or Firm*—Paul R. Webb, II

[57] ABSTRACT

A slab module for a face-pumped laser includes a box frame having top and bottom walls and opposite end walls defining a central slab chamber therein. The end walls have central access holes for receiving opposite ends of a laser slab positionable in the slab chamber. The frame also includes opposite side pockets which join with the slab chamber. The pockets are configured for receiving laser pumping modules for pumping the laser slab, with the modules including diode laser arrays in an exemplary embodiment.

4 Claims, 6 Drawing Sheets

DIODE PUMPED SLAB MODULE

CROSS-REFERENCE TO RELATED APPLICATION

This application is a Continuation of application Ser. No. 08/251,142, filed May 31, 1994, now abandoned.

The present invention is related generally to concurrently filed U.S. patent application Ser. No. 08/251,143, filed May 31, 1994, entitled "Modular Slab Assembly for a Face-Pumped Laser," assigned to the present assignee and now abandoned Oct. 12, 1994.

The present invention is also related to concurrently filed U.S. patent application Ser. No. 08/251,141, filed , May 31, 1994, entitled "Diode Laser Module," assigned to the present assignee and pending in group 2500.

The present invention relates generally to face-pumped lasers, and, more specifically, to a modular laser assembly having diode laser pumping.

BACKGROUND OF THE INVENTION

Laser assemblies include several components which require precise alignment therebetween for effective operation thereof. When lasers are used in industrial applications, they must be periodically maintained which requires disassembly of selected components thereof, repair or replacement as required, and then reassembly of the components. The reassembly process requires precise alignment of the components for obtaining effective operation of the laser. Accordingly, the laser is unusable during the down-time required for its maintenance which has a negative financial affect.

Two exemplary commercial lasers include rod lasers or face-pumped slab lasers. The face-pumped slab lasers are relatively more complex and require cooling of the components thereof for effective operation and, therefore, the reconditioning thereof is a more complex and lengthy process than that associated with the simpler rod lasers.

In U.S. Pat. No. 5,278,860, assigned to the present assignee, a modular construction for a face-pumped laser head is disclosed which utilizes a fixturing jig assembly for constructing a modular face-pumped slab laser head. And, another positioning, compression, and storage device is utilized for temporarily holding together the slab head components. It is desirable to eliminate the jig assembly and the storage device for obtaining an improved modular face-pumped laser head assembly having less complexity and reduced down-time during maintenance.

The modular face-pumped lasers identified above in the Cross-Reference Section and in the above identified patent have particular utility with conventional arc-lamp or flash-lamp optical pumping of the laser slabs therein. However, diode laser arrays are undergoing development for use in pumping laser slabs and require a suitable configuration for effectively pumping the slab while maintaining uniform slab cooling. It is also desirable to eliminate the need for the assembly jig and the storage device addressed above while maintaining effective alignment of the components with preferably modular construction for allowing ready disassembly and assembly of the components during a maintenance outage.

SUMMARY OF THE INVENTION

A slab module for a face-pumped laser includes a box frame having top and bottom walls and opposite end walls defining a central slab chamber therein. The end walls have central access holes for receiving opposite ends of a laser slab positionable in the slab chamber. The frame also includes opposite side pockets which join with the slab chamber. The pockets are configured for receiving laser pumping modules for pumping the laser slab, with the modules including diode laser arrays in an exemplary embodiment.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
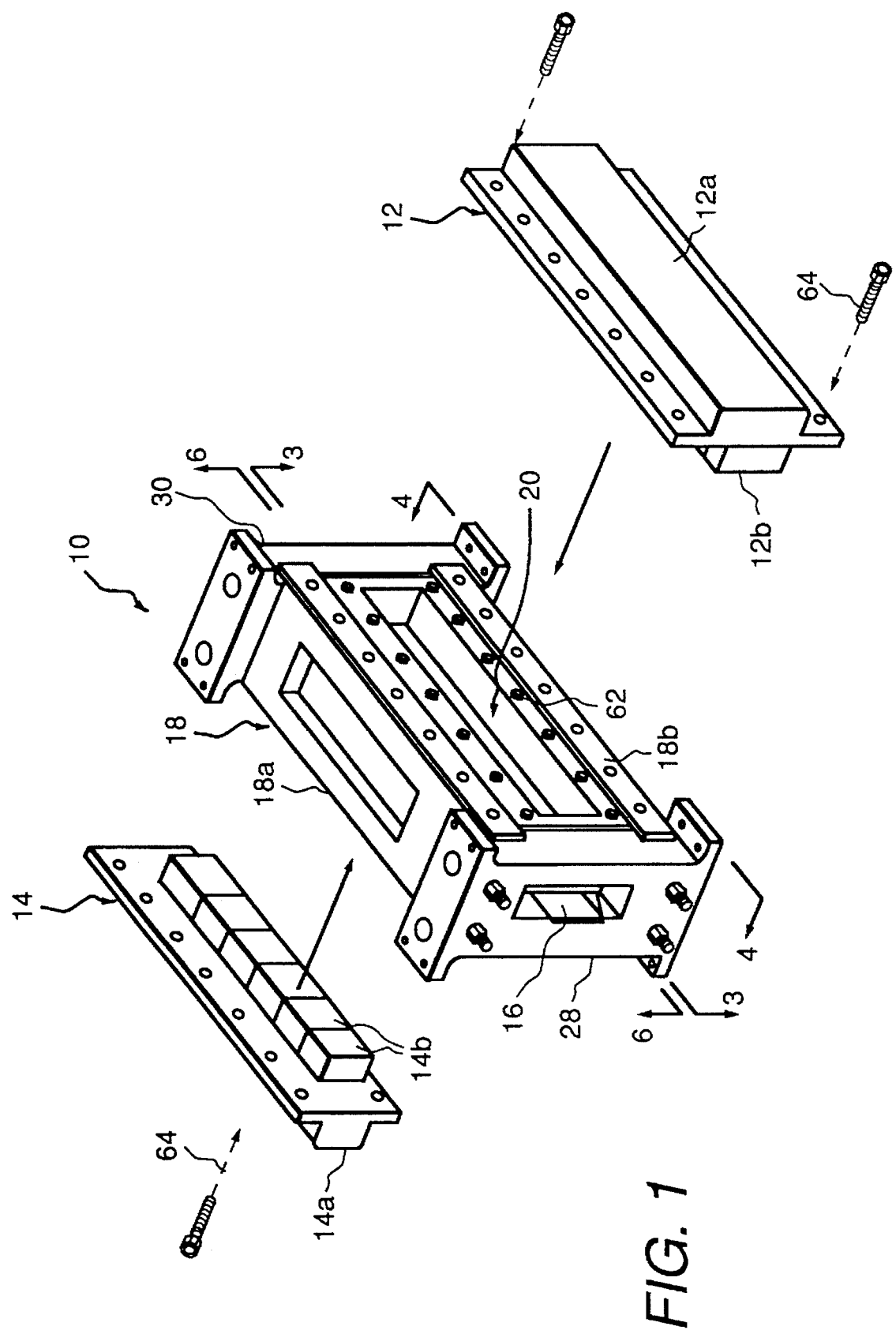
FIG. 1 is a partly exploded, perspective view of a slab module in accordance with one embodiment of the present invention having side pockets configured for receiving a pair of laser pumping modules therein.

Illustrated in FIG. 1 is an exemplary embodiment of a slab module 10 for a face-pumped laser which is configured for receiving first and second laser pumping modules 12, 14 for pumping or exciting a conventional solid state laser slab 16, such as Nd:YAG, to generate a laser beam. In this preferred embodiment, the modules 12, 14 each includes a housing 12a, 14a suitably containing respective pluralities of diode laser arrays 12b, 14b which are effective for pumping the laser slab 16. The diode arrays 12b, 14b may be in any suitable form for use in the present invention and may be obtained, for example, from SDL Incorporated (a/k/a Spectra Diode Labs) of San Jose, Calif. The details of the diode arrays themselves are not the subject of the present invention. However, the details of the diode pumping modules 12,14 are disclosed in more particularity in the second application in the Cross-Reference Section above.

Figure 2:
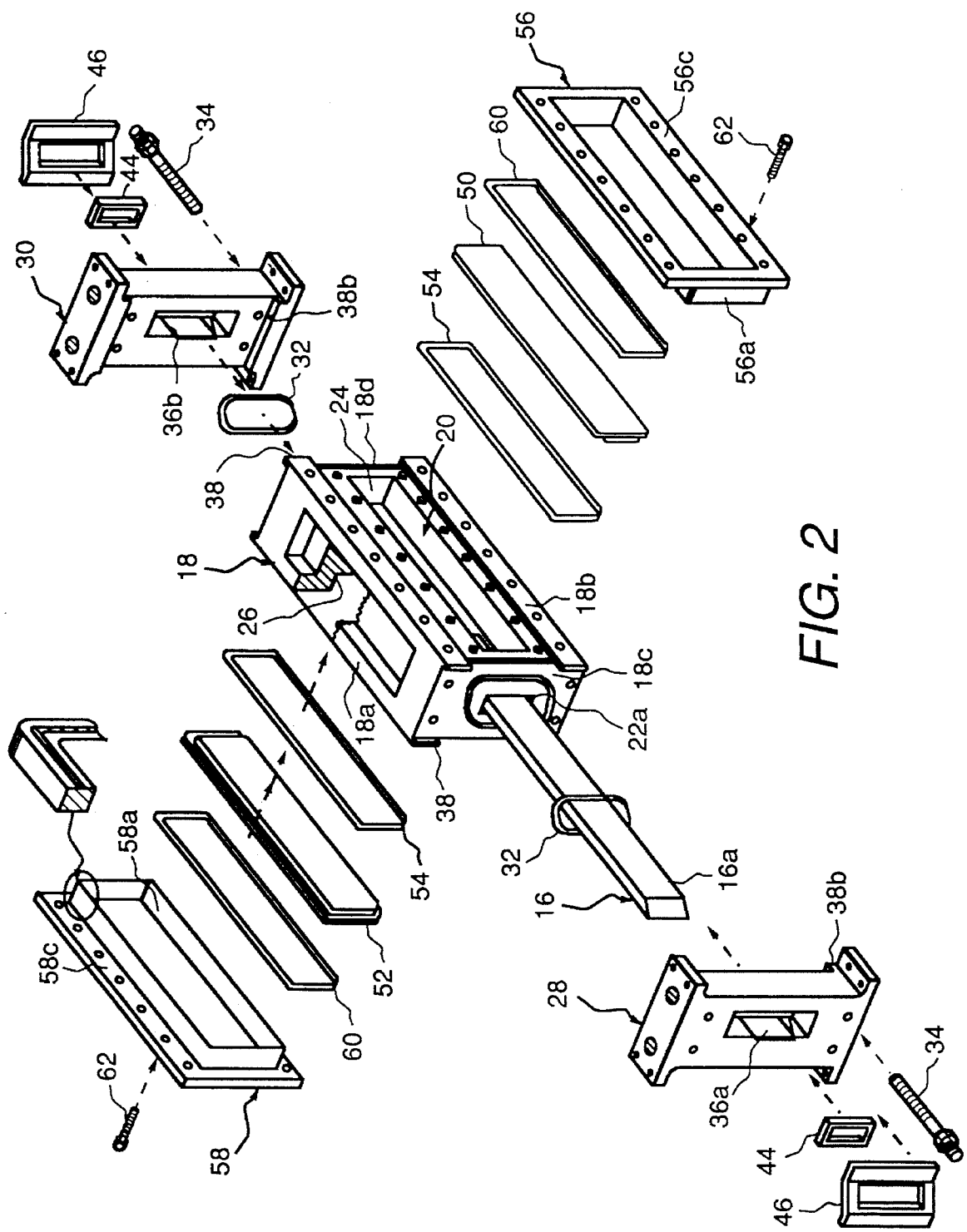
FIG. 2 is an exploded view of selected components of the slab module illustrated in FIG. 1.
Figure 3:
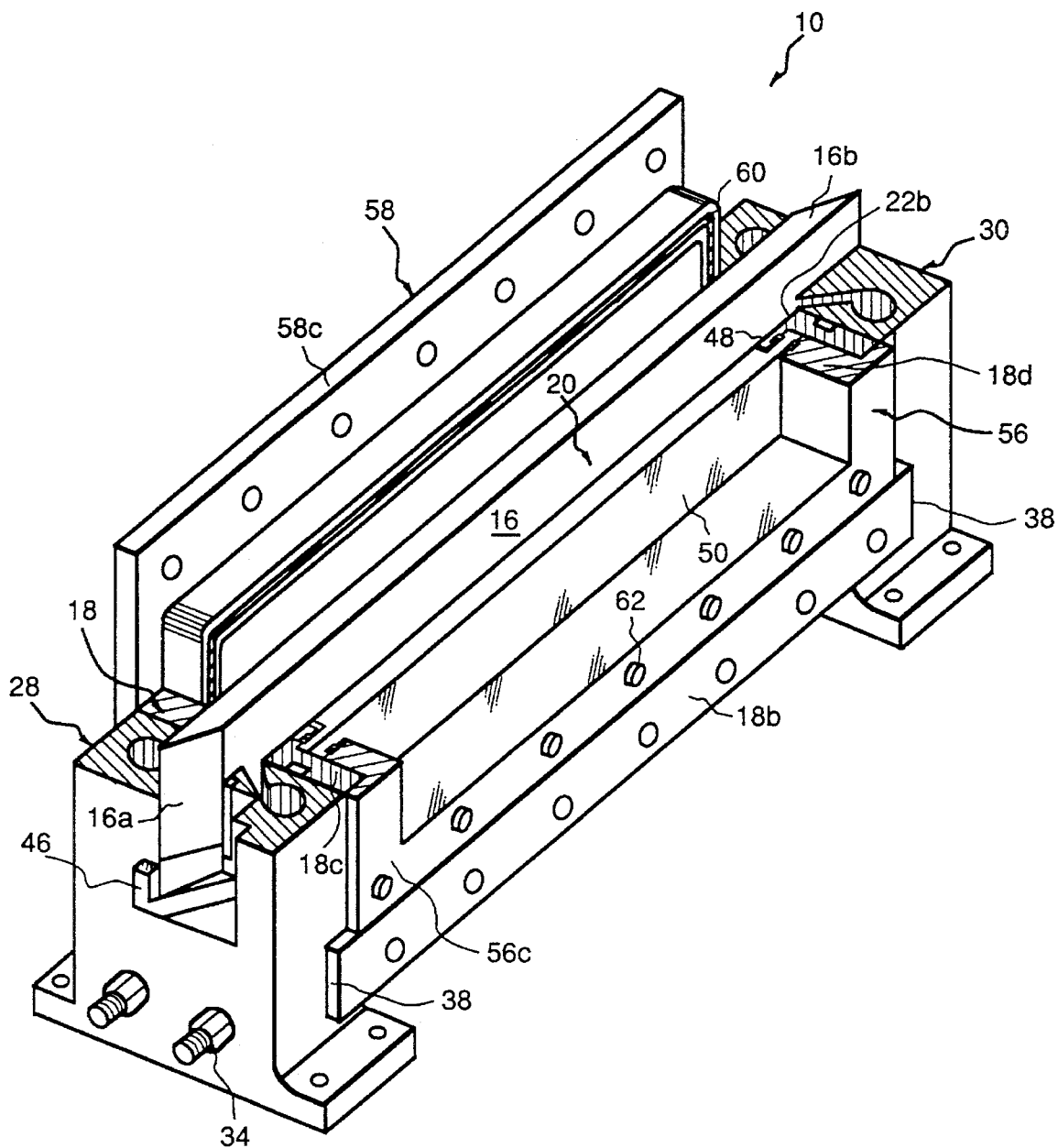
FIG. 3 is a partly sectional, perspective view of the slab module illustrated in FIG. 1 and split generally along its longitudinal axis illustrating the lower portion thereof.

The slab module 10 is illustrated in exploded view in FIG. 2 and in sectional view in FIG. 3 and includes a rigid box frame 18 which is preferably a one-piece member which may be conventionally machined from a suitable metal such as aluminum, titanium, or stainless steel. The frame includes a first or top wall 18a spaced parallel from a second or bottom wall 18b, and first and second opposite ends walls 18c and 18d integrally joined to respective opposite ends of the top and bottom walls 18a, 18b to define a central slab chamber 20 extending longitudinally between the first and second end walls 18c, 18d along the longitudinal axis of the frame 18. The frame walls 18a–d have suitable thicknesses for providing a rigid structure, and as illustrated in FIG. 2 may include lightening recesses such as in the outer surface of the top wall 18a for reducing weight of the frame 18 while maintaining rigidity.

The first and second end walls 18c, 18d have respective first and second central access holes 22a, 22b for receiving opposite first and second ends 16a, 16b of the elongate laser slab 16 which is centrally positionable within the slab chamber 20.

The frame 18 further includes first and second side pockets 24, 26 which are elongate along the longitudinal axis of the frame 18 and along the longitudinal axis of the slab 16. The pockets 24, 26 are disposed in parallel between the top and bottom walls 18a, 18b on opposite sides thereof and extend longitudinally between the first and second end walls 18c, 18d. The pockets 24, 26 extend laterally into the frame 18 and join the slab chamber 20 for forming a through passage extending laterally through the frame 18 as shown in more particularity in FIG. 5.

The first and second pockets 24, 26 are suitably configured for respectively receiving the first and second laser pumping modules 12, 14 adjacent to the slab chamber 20 as described in more detail below for pumping the laser slab 16 to generate a laser beam. Since the pumping modules 12, 14 in the preferred embodiment include the laser diode arrays 12b, 14b instead of conventional arc-lamps or flash-lamps, a suitable reflective gold-plating is not required around the slab chamber 20 which is therefore characterized by the absence thereof, and which reduces costs. Since laser diode arrays emit directional energy, they may be close-coupled adjacent to the opposite sides of the slab 16 for providing effective laser pumping thereof.

Figure 4:
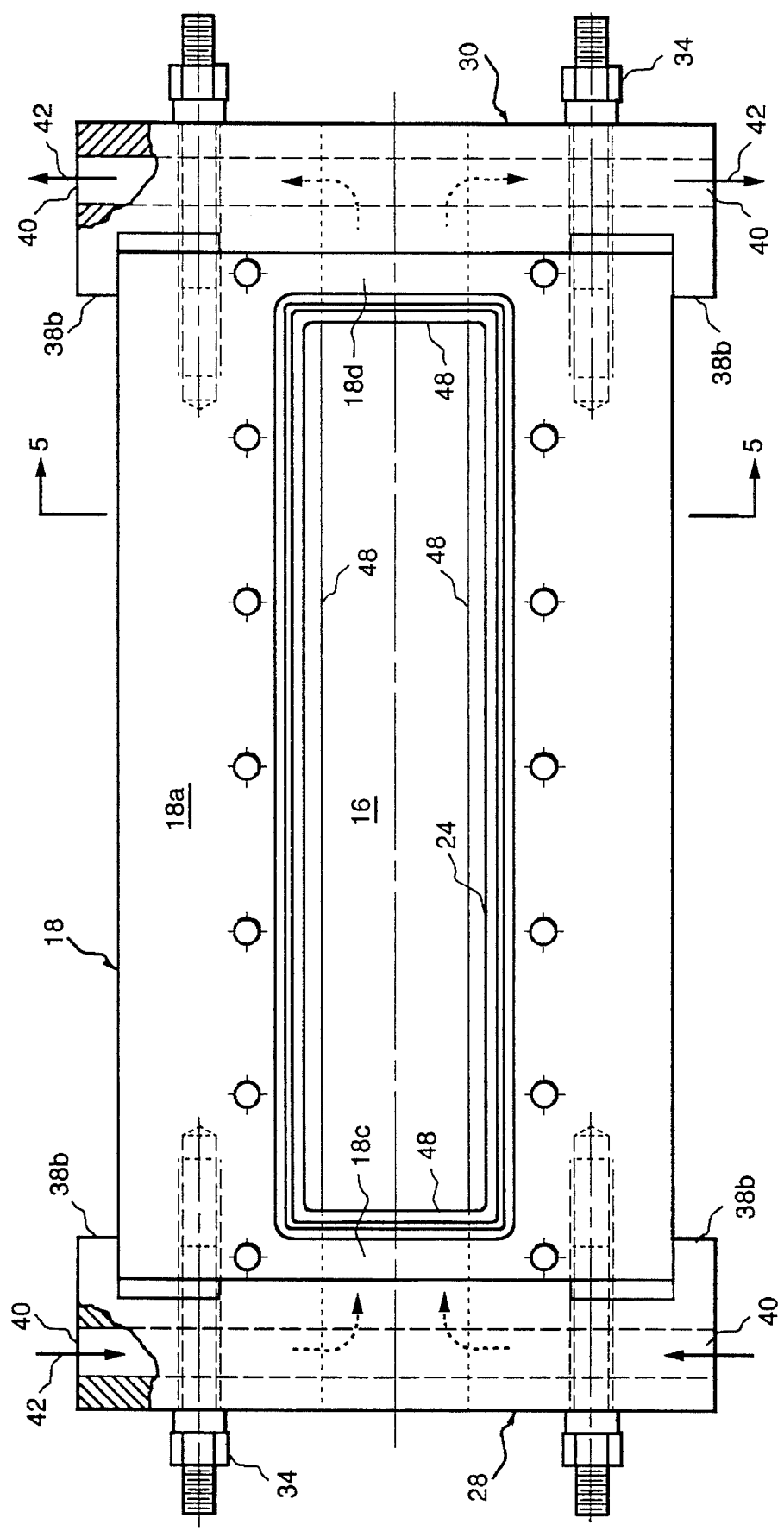
FIG. 4 is a side, elevational view, partly in section of the slab module illustrated in FIG. 1 and taken along line 4—4 with the removal of a window retainer in the side pocket.

As shown in FIGS. 2–4, the slab module 10 further includes first and second end caps 28,30, preferably stainless steel for example, fixedly and sealingly joined to the outer surfaces of the first and second end walls 18c, 18d, respectively. In the exemplary embodiment illustrated in FIG. 2, the outer surfaces of the end walls 18c, 18d have race-track grooves therein for receiving a complementary O-ring type gasket 32 which is compressed therein upon assembly of the end caps 28, 30 for providing a suitable fluid seal. Conventional double headed stud bolts 34 extend through respective apertures in the end caps 28, 30 for bolting the end caps 28, 30 in compression against the gaskets 32 and the respective end walls 18c, 18d during assembly. Four stud bolts 34 are provided for each end cap 28, 30 in the preferred embodiment for uniformly attaching the end caps 28, 30 to the frame 18.

The end caps 28, 30 have respective first and second central support holes 36a, 36b which are coaxially aligned with the first and second access holes 22a, 22b, respectively, for receiving and supporting the laser slab opposite ends 16a, 16b as described in more detail below.

In order to provide self-alignment between the first access hole 22a and the first support hole 36a upon assembly of the first end cap 28, and selfalignment between the second access hole 22b and the second support hole 36b of the second end cap 30 upon assembly, a plurality of alignment tabs 38 are disposed between the first end wall 18c and the first end cap 28 and also between the second end wall 18d and the second end cap 30. In the exemplary embodiment illustrated in FIG. 2, the first end wall 18c has four tabs 38 extending longitudinally outwardly from its four corners, and similarly, the second end wall 18 has four of the tabs 38 extending longitudinally outwardly from the four corners thereof. As shown in FIG. 3, the end caps 28, 30 are configured in width for being laterally captured between the opposing tabs 38 for providing lateral or horizontal alignment between the respective access and support holes. As shown in FIG. 4, each of the end caps 28, 30 has laterally extending tabs 38b at the top and bottom ends thereof which define a recess therebetween which is configured in height for capturing therein the respective frame end walls 18c, 18d upon assembly. The lateral tabs 38b therefore provide vertical alignment between the respective access and support holes. The cooperating tabs 38, 38b together provide both vertical and horizontal alignment of the access and support holes for properly aligning the laser slab 16 within the frame 18.

As illustrated in FIGS. 3–6, the slab 16 extends through the slab chamber 20 and the first and second access holes 22a, 22b and to the respective first and second support holes 36a, 36b. The end caps 28, 30 include conventional flow conduits 40 therethrough disposed in flow communication with the respective first and second support holes 36a, 36b at the slab ends for channeling a cooling fluid 42 such as water to and from the slab chamber 20 in a conventionally known manner.

Figure 6:
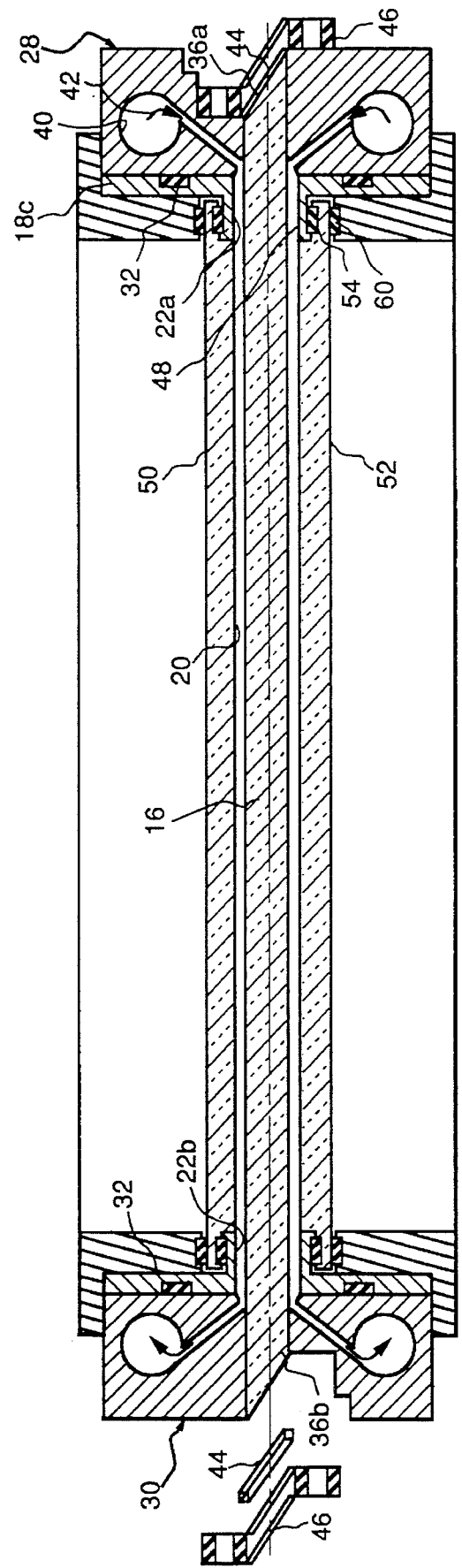
FIG. 6 is a partly exploded, sectional view of the slab module illustrated in FIG. 1 split along its longitudinal axis and taken generally along line 6—6.

A conventional gasket 44 in the form of a rectangular O-ring as illustrated in FIGS. 2 and 6 is disposed in each of the first and second support holes 36a, 36b and around respective ends of the slab 16 for both supporting the slab ends and sealing flow of the cooling fluid therepast. A conventional perforate retainer 46 having a central aperture for transmitting the laser beam is conventionally fixedly joined to each of the first and second end caps 28, 30 at the respective first and second support holes 36a, 36b for retaining the gasket 44 and the slab ends to the end caps 28, 30. The retainers 46 permit the laser beam to propagate through the slab ends in a conventionally known manner.

Figure 5:
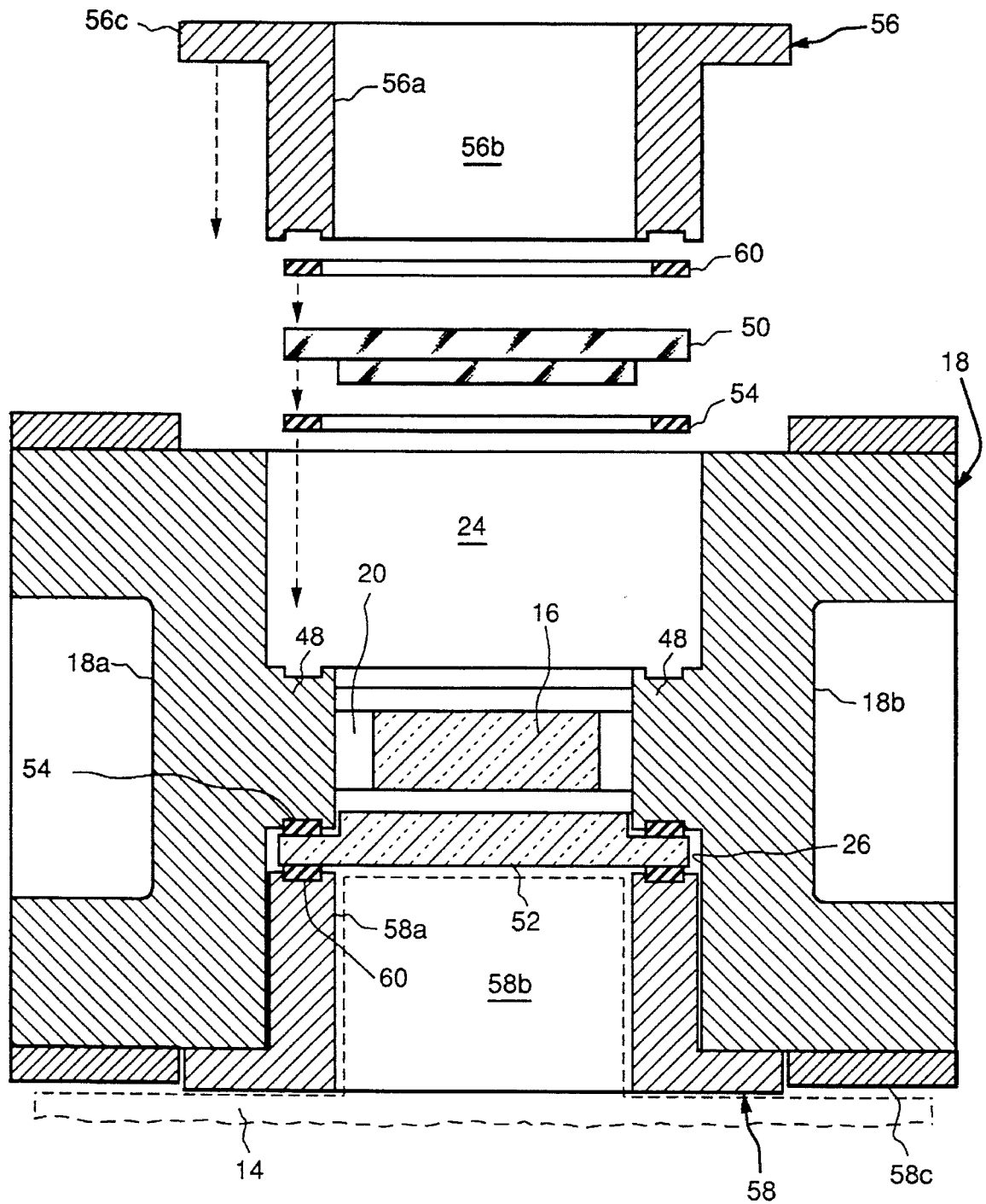
FIG. 5 is a partly sectional and partly exploded view of the slab module illustrated in FIG. 4 and taken along line 5—5.

In the exemplary embodiment illustrated in FIGS. 3–5, the frame top and bottom walls 18a, 18b and first and second ends walls 18c, 18d preferably include a common, integral step flange 48 extending inwardly therefrom to define the slab chamber 20 therebetween. As best illustrated in FIG. 4, the step flange 48 provides a four-sided generally rectangular step or ledge around the perimeter of the first side pocket 24, and similarly around the second side pocket 26. Accordingly, the first and second pockets 24, 26 extend laterally inwardly from the sides of the frame 18 to the opposite sides of the step flange 48 where they meet the slab chamber 20. The step flange 48 provides a sealed seat for engagement with first and second optically transparent windows 50, 52, made of glass for example, which are disposed in respective ones of the first and second pockets 24, 26 as shown in FIGS. 2, 3 and 6 for example. Both sides of the step flange 48 preferably include suitable grooves for receiving complementary, generally rectangular gaskets 54 against which the respective windows 50, 52 may be pressed for effecting a suitable fluid seal therebetween. In this way, the cooling fluid 42 which is channeled to flow through the slab chamber 20 between the opposing windows 50, 52 is sealed from leaking between the step flange 48 supporting the windows 50, 52. The windows 50, 52 and respective gaskets 54 prevent leaking into the respective side pockets 24, 26 while allowing optical pumping of the laser slab 16 from the pumping modules 12, 14 directly through the windows 50, 52.

As illustrated in FIG. 6, uniform passages between the slab 16 and the opposing windows 50, 52 are desired for ensuring effective and uniform cooling of the slab 16 during operation. Accordingly, the windows 50, 52 are preferably aligned with the step flange 48 for forming a smooth boundary therewith. As shown in FIG. 6 the first and second access holes 22a, 22b extend through the step flange 48, and both of the windows 50, 52 have stepped outer perimeters mounted on the step flange 48 for aligning the inner surfaces of the windows 50, 52 with the first and second access holes 22a, 22b for providing a substantially continuous, smooth, and flat boundary for flow of the cooling fluid therealong. The flush transition between the access holes 22a, 22b and the respective windows 50, 52 promotes uniform cooling flow, with both windows 50, 52 being uniformly spaced from the slab 16 for maintaining a uniform flow channel therebetween and corresponding effective cooling thereof. In the preferred embodiment illustrated in FIG. 6, for example, the windows 50, 52 are flat or planar and are spaced adjacent to opposite sides of the slab 16 to define therewith uniform flow channels for channeling the cooling fluid through the slab chamber 20 and between the first and second end caps 28, 30.

As shown in FIGS. 2 and 5, the windows 50, 52 are initially simply loosely inserted into the respective pockets 24, 26 and against the gaskets 54 in the step flange 48. To secure the windows 50, 52 in position, a pair of window retainers 56, 58 are provided. Each of the first and second window retainers 56, 58 includes a quadrilateral or four-sided sash 56a, 58a which is generally rectangular in configuration and which is complementary to and disposed in the respective first and second side pockets 24, 26 for retaining the windows 50, 52 therein as illustrated in FIG. 5 for example. Each retainer 56, 58 also includes a central receptacle 56b, 58b for receiving the respective first and second laser pumping modules 12, 14 for pumping the laser slab 16 through the windows 50, 52.

As illustrated in FIGS. 3 and 5 for example, the sashes 56a, 58a preferably have a suitable groove extending around the perimeter edge thereof for receiving a conventional gasket 60 which is compressed against the outer surface of the respective windows 50, 52 when the sashes 56a, 58a are inserted into their respective pockets 24, 26. In the exemplary embodiment illustrated in FIGS. 3 and 5, the window retainers 56, 58 preferably include respective mounting flanges 56c, 58c along the perimeters thereof having apertures therethrough for receiving conventional machine screws 62 for removably fixedly joining the retainers 56, 58 to the frame top and bottom walls 18a, 18b for retaining the windows 50, 52 against the step flange 48 in the respective pockets 24, 26. As shown in FIG. 1, the diode module housings 12a, 14a have suitable apertures along the edges thereof through which conventional machine screws 64 may be inserted for removably fixedly joining the modules 12, 14 to the frame top and bottom walls 18a, 18b, with the diode laser arrays 12b, 14b being positioned inside the respective window receptacles 56b, 58b (see FIG. 5) and in turn inside the respective pockets 24, 26 closely adjacent to the respective windows 50, 52. In this way, the diode arrays 12b, 14b are close-coupled to the laser slab 16 for providing effective pumping thereof directly through the windows 50, 52. When assembled to the box frame 18, the pumping modules 12, 14 cover or enclose the window retainers 56, 58 providing a compact slab module assembly or head.

Accordingly, the box frame 18 provides a rigid structure for mounting the end caps 28, 30 and accurately supporting the laser slab 16 therein. The flat windows 50, 52 disposed adjacent to the laser slab 16 provide uniform cooling flow passages adjacent to the slab 16 for providing uniform cooling thereof. The tabs 38a, 38b provide self-alignment to ensure the proper relative position of the slab within the frame 18 and for effecting the uniform cooling passages therein. The removable windows 50, 52 and window retainers 56, 58 enhance modularity and easy assembly and disassembly of components as required. The window retainers 56, 58 provide suitable receptacles for receiving the pumping modules 12, 14 which are also readily removable for inspection as well as replacement thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A slab module for a face-pumped laser comprising:

a one-piece box frame having a top wall spaced parallel from a bottom wall, and first and second opposite end walls integrally joined to respective ones of said top and bottom walls to define a central slab chamber extending longitudinally between said first and second end walls;

said first and second end walls having respective first and second central access holes for receiving opposite ends of a laser slab positionable within said slad chamber;

said frame further including first and second elongate side pockets disposed in parallel between said top and bottom walls on opposite sides thereof and extending longitudinally between said first and second end walls, said first and second pockets extending laterally into said frame for joining said slab chamber and forming a through passage extending laterally through said frame;

said first and second pockets being configured for respectively receiving first and second laser pumping modules adjacent to said slab chamber for pumping said laser slab;

first and second end caps fixedly joined to said first and second end walls respectively;

said first and second end caps having respective first and second central support holes coaxially aligned with said first and second access holes for receiving and supporting said opposite ends of said laser slab; and a plurality of alignment tabs disposed between said first end wall and said first end cap and between said second end wall and said second end cap for providing self-alignment between said first access hole and said first support hole, and between said second access hole and said second support hole.

2. A slab module according to claim 1 further comprising:

said slab extending through said slab chamber and said first and second access holes into said first and second support holes;

a plurality of flow conduits disposed in said first and second end caps in flow communication with respective ones of said first and second support holes for channeling a cooling fluid to and from said slab chamber;

a gasket disposed in each of said first and second support holes and around respective ends of said slab for sealing flow of said fluid therepast; and a perforate retainer fixedly joined to each of said first and second end caps at said respective first and second support holes for retaining said gaskets and said slab ends to said first and second end caps while permitting a laser beam to propagate through said slab ends.

3. A slab module according to claim 2 wherein:

said top and bottom walls and said first and second end walls include a common step flange extending inwardly therefrom to define said slab chamber therebetween;

said first and second pockets extend laterally inwardly to opposite sides of said step flange;

first and second transparent windows disposed in respective ones of said first and second pockets in sealing engagement with said step flange for sealing said cooling fluid flowable through said slab chamber from leaking into said first and second pockets while allowing pumping of said laser slab from said pumping modules through said windows;

said first and second access holes extend through said step flange; and said windows have stepped perimeters mounted on said step flange for aligning inner surfaces of said windows with said first and second access holes for providing a flat boundary for flow of said cooling fluid therealong.

4. A slab module according to claim 3 wherein said windows are flat and spaced adjacent to opposite sides of said slab to define therewith uniform flow channels for channeling said cooling fluid through said slab chamber and between said first and second end caps;

a pair of window retainers, each having a quadrilateral sash being complementary to and disposed in said first and second side pockets respectively, for retaining said windows therein, and each having a central receptacle for receiving said respective first and second laser pumping modules for pumping said laser slab through said windows;

said laser pumping modules each includes a plurality of diode laser arrays disposed in said respective pockets adjacent to said windows, and being effective for pumping said laser slab through said windows;

said window retainers each includes a mounting flange along a perimeter thereof removably fixedly joined to said top and bottom walls for retaining said windows in said pockets; and said laser pumping modules each further includes a housing containing said diode laser arrays said housings being removably fixedly joined to said top and bottom walls and enclosing said window retainers.

* * * * *